United States Patent
Hardacker et al.

(10) Patent No.: US 8,457,175 B2
(45) Date of Patent: Jun. 4, 2013

(54) SYSTEMS AND METHODS FOR SECURING A DIGITAL COMMUNICATIONS LINK

(75) Inventors: Robert Hardacker, Escondido, CA (US); James R. Milne, Ramona, CA (US); Bob Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 896 days.

(21) Appl. No.: 12/556,819

(22) Filed: Sep. 10, 2009

(65) Prior Publication Data
US 2010/0002750 A1 Jan. 7, 2010

Related U.S. Application Data (63) Continuation-in-part of application No. 12/021,668, filed on Jan. 29, 2008.

(51) Int. Cl.
*H04B 1/00* (2006.01)

(52) U.S. Cl.
USPC ............................................. 375/133; 375/135

(58) Field of Classification Search
USPC ......................................... 375/133, 132, 130
See application file for complete search history.

(56) References Cited

U.S. PATENT DOCUMENTS

| | | | |
|---|---|---|---|
| 3,610,828 A | 10/1971 | Girard et al. | |
| 4,903,297 A | 2/1990 | Rist et al. | |
| 5,504,783 A | 4/1996 | Tomisato et al. | |
| 5,530,756 A | 6/1996 | Bourel et al. | |
| 5,822,429 A | 10/1998 | Casabona et al. | |
| 6,606,296 B1 | 8/2003 | Kokkonen | |
| 6,973,188 B1 | 12/2005 | Seitner | |
| 2006/0013285 A1* | 1/2006 | Kobayashi et al. | 375/132 |
| 2006/0066469 A1* | 3/2006 | Foote et al. | 342/22 |
| 2007/0058693 A1 | 3/2007 | Aytur et al. | |
| 2007/0237274 A1* | 10/2007 | Nakache et al. | 375/355 |
| 2008/0043861 A1 | 2/2008 | Moffatt | |
| 2008/0089222 A1* | 4/2008 | Kim et al. | 370/208 |
| 2008/0130785 A1* | 6/2008 | Reinhardt | 375/296 |

FOREIGN PATENT DOCUMENTS
EP 0 167 442 1/1986

* cited by examiner

*Primary Examiner* — David C. Payne
*Assistant Examiner* — Brian J Stevens
(74) *Attorney, Agent, or Firm* — Fitch, Even, Tabin & Flannery LLP (57) ABSTRACT

The frequency of a digital data signal, such as a digital video signal, is intentionally varied or hopped before being sent over a network. This frequency hopping may be performed in accordance with a frequency hopping pattern shared with only intended receivers. The digital data signal may be further intentionally pre-distorted in accordance with a pre-distortion pattern which is also shared with only intended receivers. The frequency hopping and/or the pre-distortion patterns may be used to vary the frequency and modulation, respectively, on a periodic basis, such as a symbol-by-symbol or packet-by-packet basis.

24 Claims, 8 Drawing Sheets

SYSTEMS AND METHODS FOR SECURING A DIGITAL COMMUNICATIONS LINK

RELATED APPLICATION

This application is a continuation-in-part of application Ser. No. 12/021,668, filed on Jan. 29, 2008.

FIELD OF THE INVENTION

The invention relates in general to securing communications, and in particular, to securing communications link based on frequency hopped symbol transmission, and further optionally by modifying one or more signal characteristics, such as signal pre-distortion, pre-emphasis, varying modulation.

BACKGROUND OF THE INVENTION

Communications, whether wireline or wireless, often involve the transfer of sensitive information. In order to avoid exposing or otherwise allowing third-party access to such information, sensitive communications are typically encrypted using various known cryptographic algorithms, such as the Advanced Encryption Standard (AES), Data Encryption Standard (DES), etc. However, use of such cryptographic algorithms involve both encrypting and decrypting communications, which tends to contribute a relatively large amount of processing overhead to the overall communication process. This can be particularly burdensome in the context of high-definition video content which alone requires a relatively high amount of processing power to perform both the encoding and decoding functions.

In addition, particularly in the wireless context, the quality of the communication channel can quickly degrade. Such signal distortion must be compensated for on the receiver-side before the signal can be properly demodulated. Thus, in order to properly receive an encrypted video signal, both a signal distortion correction operation and a decryption operation must be performed before the signal itself can even be demodulated in accordance with whatever video modulation scheme is being used (e.g., Binary Phase-shift Keying (BPSK), Quadrature phase-shift keying (QPSK), Quadrature amplitude modulation (QAM), Orthogonal Frequency-Division Multiplexing (OFDM), etc.). The end result is that relatively complex and expensive hardware is required on the receiver-side in order to accurately process the incoming encrypted video stream. Thus, there is a need for a system and method for securing a communication link that do not rely on traditional encryption schemes.

SUMMARY OF THE INVENTION

Disclosed and claimed herein are methods, systems and devices for providing secure digital communications. In one embodiment, a method includes transmitting a frequency hopping pattern over a network to an intended receiver, setting a first transmission frequency in accordance with the frequency hopping pattern, and then transmitting a first symbol of a data signal over the network at the first transmission frequency to the intended receiver. The method further includes setting a second transmission frequency after transmitting the first symbol, where the second transmission frequency is also based on the frequency hopping pattern, and then transmitting the second symbol of the data signal over the network at the second transmission frequency to the intended receiver.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Disclosure Overview

One aspect of the present disclosure relates to shifting the frequency at which a digital data signal, such as a digital video signal, is transmitted in order to secure the underlying transmission. In the context of high frequency digital data signals, the magnitude of each frequency shift may be on the order of several gigahertz (GHz) or even tens of GHz (e.g., 50-100 GHz) over a transmission range of 100 or even 200 GHz, for example. As virtually all digital modulation schemes utilize a finite number of distinct "symbols" to represent digital data, each frequency shift preferably may be performed from one transmitted symbol to the next (i.e., frequency shifts between each transmitted symbol).

In one embodiment, the frequency hopping may be performed (e.g., by a transmitter) in accordance with a frequency hopping pattern or algorithm which is shared with only intended receivers. Without knowledge of the timing and magnitude of the frequency hop to be applied to a given symbol, an unintended receiver will have difficulty intercepting the signal. And by shifting the frequency on a per-symbol basis and over a wide range of frequencies, it becomes very difficult to lock onto or track the frequency hopping pattern, thereby securing or otherwise inhibiting third-party access to the content of the underlying digital data signal.

Another aspect of the present disclosure relates to also pre-distorting the modulation of the aforementioned digital data signal so as to further secure and inhibit unauthorized access to the content of the underlying digital data signal. In one embodiment, and as with the aforementioned frequency hopping, the pre-distortion may be performed on the transmitter-side in accordance with a pre-distortion pattern or algorithm which is shared with only intended receivers. It should further be appreciated that the pre-distortion pattern may be used to vary the pre-distortion on a periodic basis, as frequently as on a symbol-by-symbol basis. The pre-distortion function may include distorting the phase and/or the amplitude of the signal's modulation. Thus, when combined with the aforementioned frequency hopping, this pre-distortion function will impart a very high degree of security to a digital data signal without the need for applying any complex encryption schemes. Other embodiments and aspects are disclosed and claimed herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

It should be appreciated that the invention and processes described herein may be implemented using hardware, software or any combination thereof (e.g., embedded logic), and the invention should not be limited to any particular system design or implementation.

Exemplary Embodiments

Figure 1A:
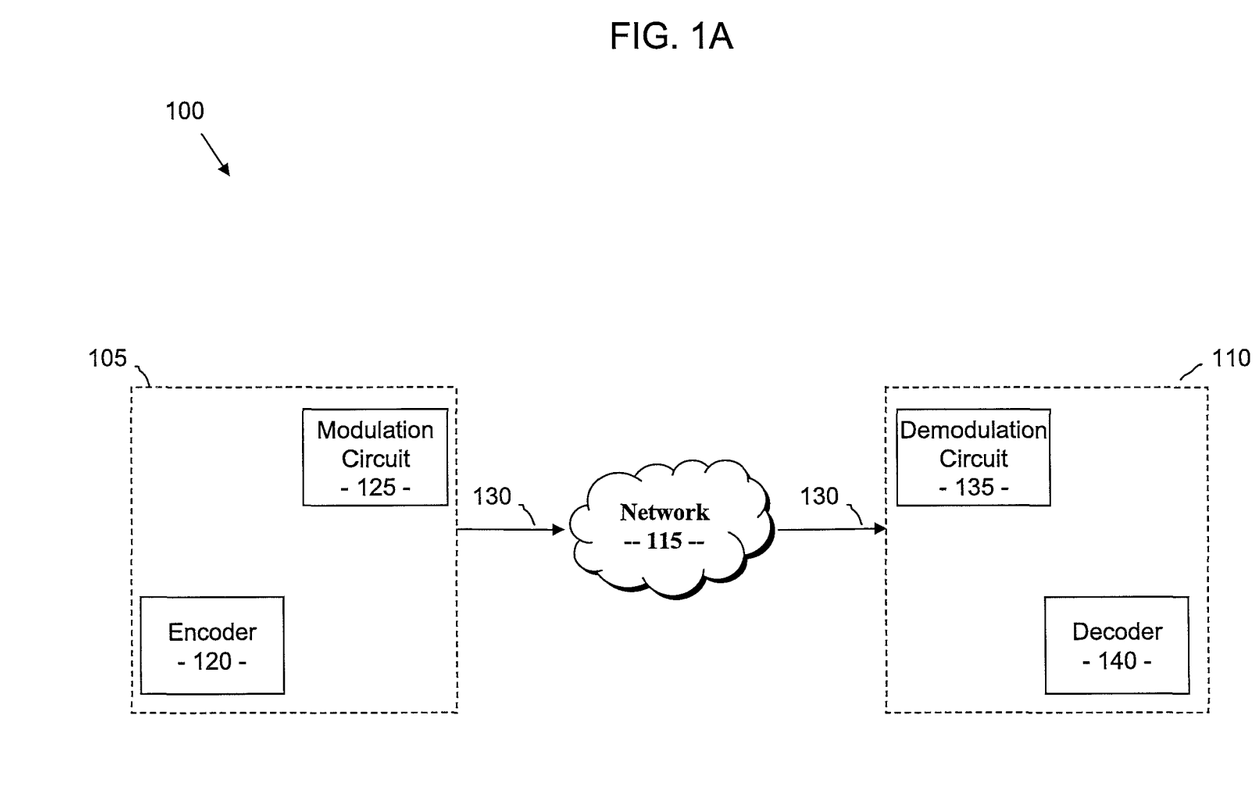
FIGS. 1A-1B depict simplified system-level diagrams for implementing one or more embodiments of the invention.

With reference now to FIG. 1A, depicted is one embodiment of a system 100 for carrying out one or more aspects of the invention. In particular, system 100 includes a transmitter 105 in communication with a receiver 110 over a network 115, which may comprise a wireline or wireless network utilizing any known communication protocol, such as a 802.11x or the like.

As shown, transmitter 105 includes at least an encoder 120 and a modulation circuit 125. In one embodiment, the encoder 120 encodes data, such as video data from a source (not shown) in order to provide digital signal 130 to some destination point (i.e., receiver 110) via a network 115. In one embodiment, the encoder 120 may encode video content in accordance with the H.264/AVC coding standard, or any other video encoding standard. Once encoded, the digital signal 130 is provided to the modulation circuit 125, which may be configured to set both the frequency and modulation of the digital signal 130, and to then subsequently transmit the signal 130 out over network 115. It should of course be appreciated that any video encoding scheme may be used, and that the network 115 may comprise any wireline or wireless network, such as 802.11x wireless network.

In setting the frequency and pre-distortion operation as described herein, the frequency of the outgoing signal may be intentionally altered (i.e., frequency hopping) by the modulation circuit 125, which may further optionally intentionally alter the phase and/or amplitude of such signal. In certain embodiments, the frequency hopping and pre-distortion may correspond to predetermined patterns or algorithms known only to the transmitter 105 and the receiver 110 (and any other intended receivers). In this fashion, the digital signal 130 may be transmitted, symbol by symbol, via network 115 to receiver 110, where each symbol (or group of symbols) may be transmitted at a frequency defined by a frequency hopping pattern or algorithm.

As shown, the receiver 110 further includes at least a demodulation circuit 135 and decoder 140, where the demodulation circuit 135 may further comprise known circuitry for receiving digital data over a range of frequencies. Once the digital signal 130 is received by the receiver 110, the demodulation circuit 135 may demodulate the received signal by undistorting the modulation of the digital signal 130, as will be described in more detail below. While in certain embodiments the digital signal 130 is both a distorted and frequency hopping signal, in other embodiments the digital signal 130 may be transmitted and received without distortion, but at a plurality of frequencies which vary from symbol to symbol in accordance with a predetermined frequency hopping algorithm or pattern that is known to both the transmitter 105 and the receiver 110.

Once the signal is received and undistorted (if needed), the digital signal 130 may be decoded by decoder 140 using the appropriate coding standard used by the encoder 120 (e.g., H.264/AVC).

Although not depicted, it should equally be appreciated that the transmitter 105 and/or receiver 110 may include other components, such as a central processing unit (CPU) or other known controller circuitry. Moreover, as the invention may be implemented using any combination of software and hardware, the transmitter 105 and receiver 110 may include embedded logic for carrying out the processes of the invention, as detailed herein.

Other components of the transmitter 105 and/or receiver 110 may include random access memory, non-volatile memory (e.g., hard disk, floppy disk, CD-ROM, DVD-ROM, tape, high density floppy, high capacity removable media, low capacity removable media, solid state memory device, etc., and combinations thereof). Additionally, the transmitter 105 and/or receiver 110 may include a network interface (e.g., a network interface card, a modem interface, integrated services digital network, etc.) for communication over network 115.

It should be appreciated that system 100 may have numerous alternate configurations other than as depicted in FIG. 1A. For example, the encoder 120 may be separate from the transmitter 105 and/or the decoder 140 need not be integrated into the receiver 110.

Figure 1B:
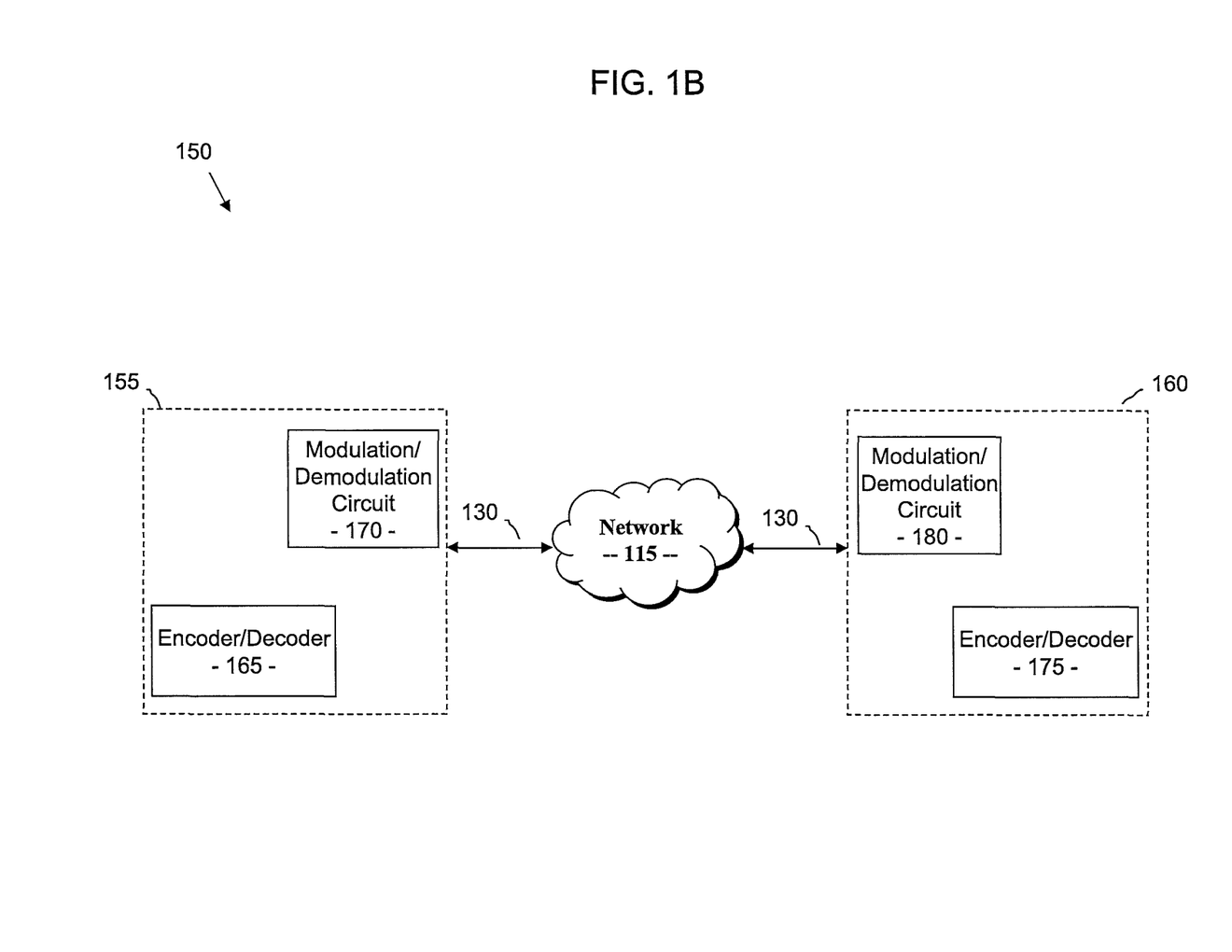

FIG. 1B depicts another embodiment of a system 150 configured to implement one or more embodiments of the invention. In particular, system 150 includes a first transceiver 155 in communication with a second transceiver 160 over the network 115. Since it is likely that communication will be two-way, the first and second transceivers may exchange the encoded data 130 over 115 in a back-and-forth manner. In order to provide two-way functionality, the first and second transceivers 155 and 160 may each include an encoder/decoder 165 and 175, respectively, which are each configured to perform both encoding and decoding operations.

The first and second transceivers 155 and 160 are further depicted as each including a modulation/demodulation circuit 170 and 180, respectively, for both modulating and transmitting data the encoded data 130, on the one hand, and also receiving and demodulating the encoded data 130, on the other hand. In this fashion, each of the first transceiver 155 and second transceiver 160 may be configured to transmit data in accordance with the known frequency hopping pattern and to optionally perform the pre-distortion operation described above, as well as to receive such data at the then-applicable frequency and to perform the reverse distortion operation when receiving data, if needed.

Figure 2:
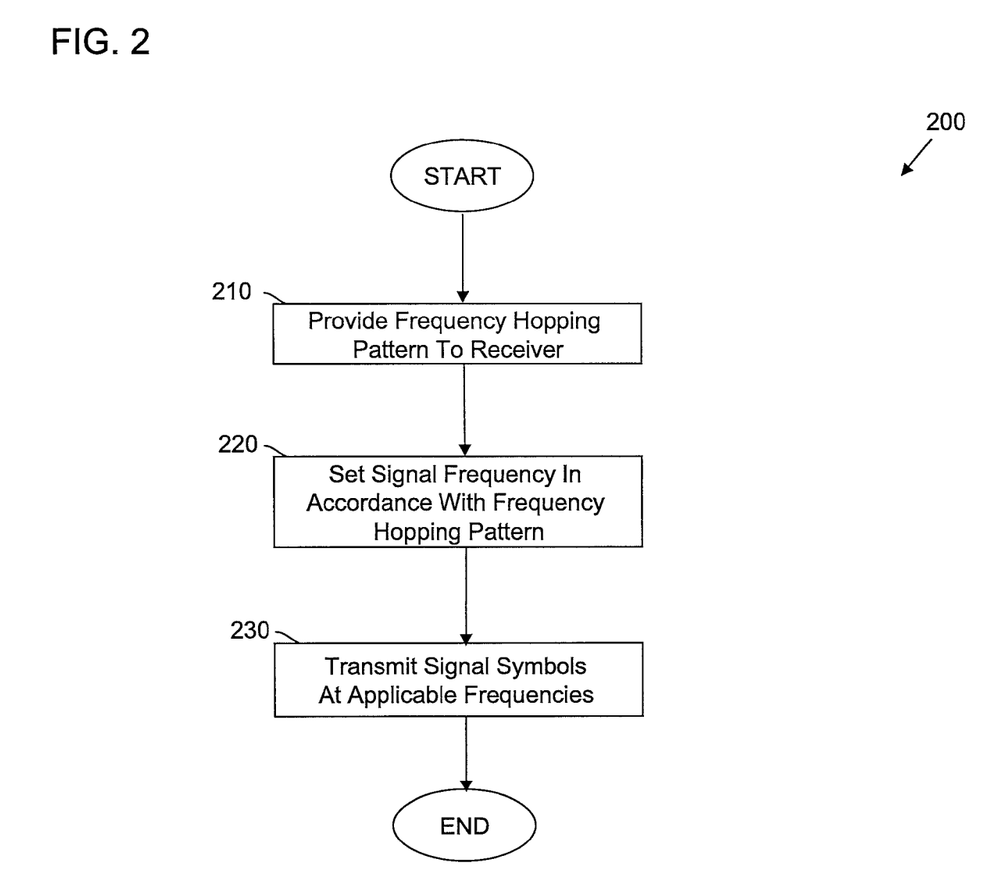
FIG. 2 is a process for implementing one or more aspects of the invention.

Referring now to FIG. 2, depicted is one embodiment of a process to be carried out by the transmission side of a communication system (e.g., system 100 or 150) configured in accordance with the principles of the invention. In particular, process 200 begins at block 210 with a receiver being provided with a frequency hopping pattern or algorithm. It should be appreciated that the pattern may be provided to the receiver in any manner, so long as it precedes the reception of the frequency hopping signal itself. In one embodiment, the frequency hopping pattern may include data representative of how the frequency is to be varied prior to transmission such as, but not limited to, varying the frequency of the signal on a symbol-by-symbol basis.

Process 200 may then continue to block 220 where the frequency at which the digital signal is to be transmitted may be set in accordance with the frequency hopping pattern that was provided to the receiver above in block 210. As previously described, it should be appreciated that such frequency hopping may be applied to the signal every N symbols transmitted, or as frequently as on a symbol-by-symbol basis. Thus, the operation of block 220 may be an iterative operation in which the signal frequency is rapidly and continuously being modified on a symbol-by-symbol, basis, for example, and in accordance with the frequency hopping pattern.

Once the then-applicable transmission frequency has been set, process 200 continues to block 230 where the symbols comprising the digital signal may be transmitted out over a network connection at the then-applicable frequencies—it being understood that the characteristics of the symbols are defined by the modulation scheme is being used by the system (e.g., BPSK, QPSK, QAM, OFDM, etc.)

As previously described, another aspect of the invention is to combine a frequency hopping signal with the intention pre-distortion of the signal in order to impart a high degree of security to a digital data signal without the need for applying any complex encryption schemes.

Figure 3A:
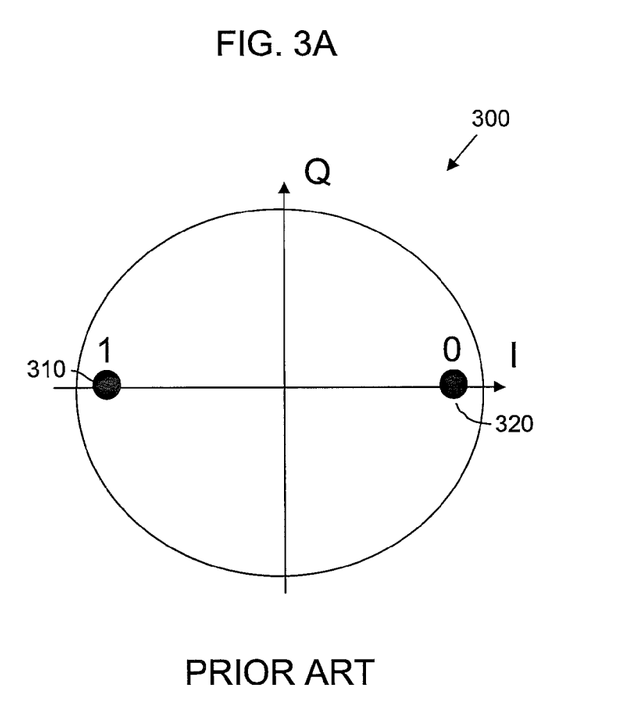
FIG. 3A depicts a typical BPSK constellation diagram without distortion.

To that end, and by way of background FIG. 3A depicts a typical constellation diagram 300 for a BPSK modulated signal. BPSK, like all digital modulation schemes, utilizes a finite number of distinct symbols to represent digital data. In particular, BPSK uses a finite number of carrier wave phases, each assigned a unique pattern of binary bits. In addition, each pattern of bits forms the symbol that is represented by a particular phase. A receiver-side decoder or demodulator will determine the phase of the received signal and map it back to the symbol it represents, thus recovering the original data. This requires the receiver to be able to compare the phase of the received signal to a reference signal. In addition to phase-shift keying, other shift keying types include amplitude-shift keying (ASK), frequency-shift keying (FSK) and (PSK).

BPSK modulation utilizes two phases—represented in FIG. 3A by constellation points 310 and 320, respectively. The BPSK constellation points 310 and 320 are positioned with uniform angular spacing to impart maximum phase-separation between adjacent points. In addition, they are positioned on a circle so as to be transmitted using the same energy. In this fashion, the amplitudes needed to represent the data within the carrier wave will be the same regardless of the data composition.

FIG. 3A includes the real and imaginary axes—referred to as the in-phase and quadrature axes respectively. In short, the amplitude of each point along the in-phase axis is used to modulate a cosine (or sine) carrier wave and the amplitude along the quadrature axis to modulate a sine (or cosine) wave.

In short, a BPSK symbol comprised of constellation point 310 will denote a binary bit value of "1," while a BPSK symbol comprised of constellation point 320 will denote a binary bit value of "0".

In reality, data may be inadvertently distorted due to degrading channel conditions, interference and the like. Thus, while FIG. 1A show a "1" bit as being 180 degrees on the I-axis and a "0" as being 0 degrees on the I-axis, channel distortion can shift constellation point positions and, as such, receivers are expected to be able to differentiate between a "1" and a "0" with less than 90 degrees distortion.

Figure 3B:
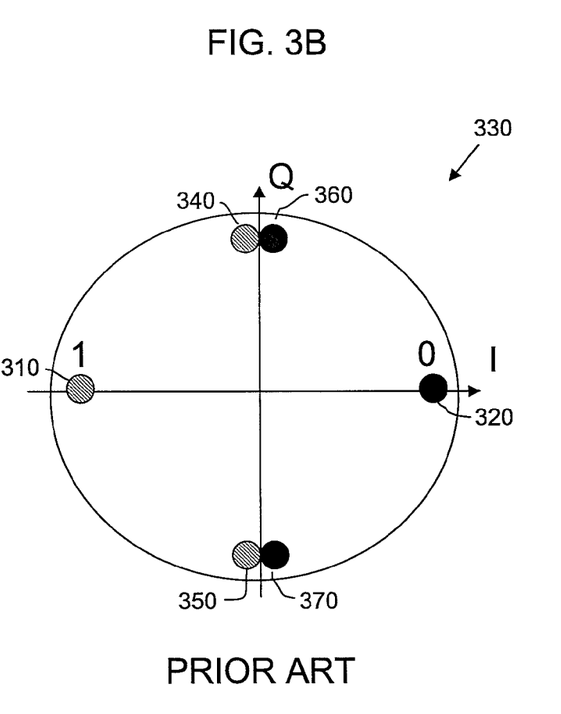
FIG. 3B depicts a typical BPSK constellation diagram with distortion.

By way of illustration, FIG. 3B depicts a constellation diagram 330 in which both constellation points 310 and 320 may be distorted by ±89 degrees. For example, constellation point 340 represents a +89 degrees phase distortion relative to the "1" bit, while constellation point 350 represents a −89 degrees phase distortion relative to the "1" bit. Similarly, constellation point 360 represents a −89 degrees phase distortion relative to the "0" bit, while constellation point 370 represents a +89 degrees phase distortion relative to the "0" bit. However, if the phase distortion exceeded 90 degrees, it would be difficult for the receiver to distinguish between a "1" bit and a "0" bit.

In order to compensate for signal distortion (particularly phase distortion greater than ±89 degrees), a preamble or header frame may be used. That is, a data stream will be preceded by a preamble comprised of a string of predetermined bits. This string of predetermined bits is known to the receiver and, as such, can be compared to a known reference pattern in order to determine the amount and direction of phase distortion correction to apply to the incoming signal. The preamble may be sent only once, or periodically in order to account for changing channel conditions.

Figure 4A:
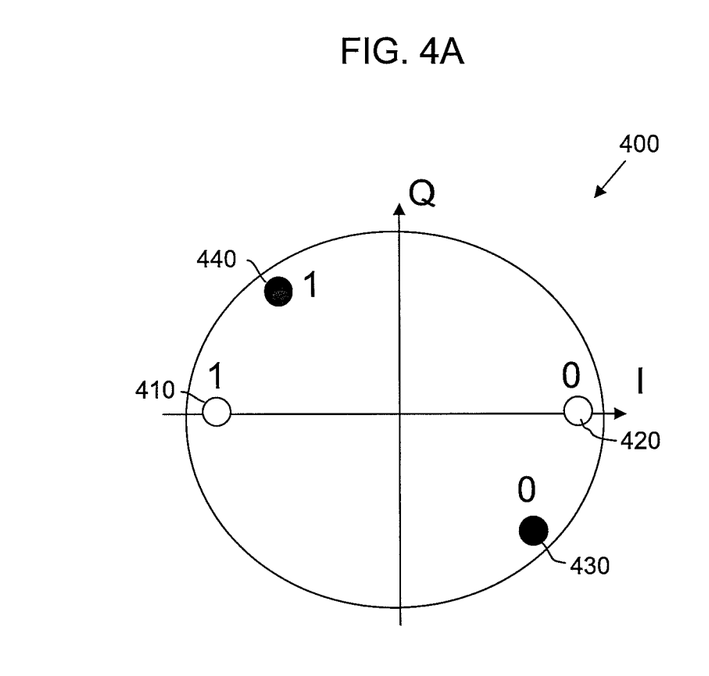
FIGS. 4A-4B depict a BPSK constellation diagram corresponding to various embodiments of the invention.

With the above provided by way of background, in addition to applying a frequency hopping pattern to a digital data signal, certain embodiments of the invention further include pre-distorting the modulation of the frequency-hopping digital data signal such that only an intended receiver is able to discriminate both the frequency hopping and distortion pattern correctly. To that end, FIG. 4A depicts a BPSK diagram for a preamble 400 in accordance with one embodiment of the invention. In particular, a typical receiver using BPSK modulation would expect the "1" bit to be in or around position 410 and the "0" bit to be in and around position 420. Upon receiving the preamble 400, a typical receiver would compare the preamble 400 to a reference preamble and determine that the actual signal distortion has rotated the constellation points 430 and 440 by 45 degrees, as shown in FIG. 4A. A complimentary phase correction would then be applied to all subsequently-received data.

Figure 4B:
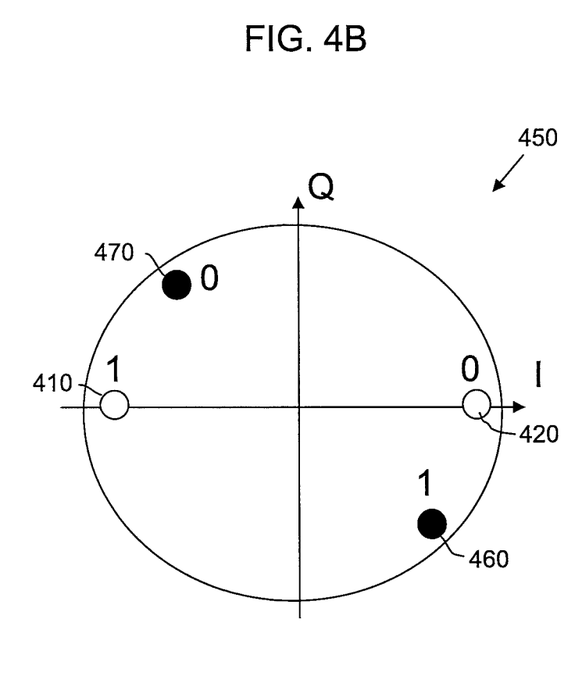

However, if a pre-distortion of 90 degrees is applied to the data packets which follow the aforementioned preamble, the correction applied by all unsuspecting receivers would erroneously interpret each "1" bit as a "0" bit and each "0" bit as a "1" bit. For example, the diagram of data frame 450 in FIG. 2B shows the actual positions of constellation points 460 and 470, which, based on the preamble 400 of FIG. 4A, would be incorrectly rotated to positions 420 and 410, respectively. For any receiver which was not aware of the 90 degree pre-distortion, the frame 450 would be interpreted incorrectly. In this fashion, a frequency hopping communication link between a transmitter and an intended receiver may be further secured.

While in certain embodiments, the preamble itself (e.g., preamble 400) may also be frequency hopped and/or pre-distorted in accordance with a frequency hopping and/or pre-distortion pattern, respectively. It should further be appreciated that an undistorted and frequency-fixed preamble may be sent instead and used by all available receivers. However, the signal, which would follow such a preamble, may then be frequency hopped and pre-distorted by the transmitter such that the data is unreadable by any unintended receiver, despite the fact such unintended receivers have properly corrected for actual signal distortion in accordance with the undistorted preamble received.

While in one embodiment the frequency hopping and pre-distortion may be applied only once, such as at the beginning of the transmission, it should further be appreciated that the amount or direction of the frequency hopping and pre-distortion may vary periodically, even as frequently as on a symbol-by-symbol basis. As previously described both the frequency hopping and pre-distortion may be applied by the transmitter in accordance with frequency hopping and pre-distortion patterns shared with only intended receivers prior to transmission.

While the disclosure to this point has used BPSK modulation as the basis for an exemplary embodiment, it should further be appreciated that the principles of the invention are equally applicable to any other modulation scheme, such as QPSK, QAM, OFDM, etc. Additionally, the pre-distortion may include amplitude pre-distortion, either separately or in combination with the aforementioned phase pre-distortion. In still another embodiment, the communication link may be secured using pre-emphasis or by varying the frequency and/or modulation scheme on a periodic basis, including on a packet-by-packet or symbol-by-symbol basis.

For those embodiments which vary the frequency and pre-distortion rapidly (e.g., symbol-by-symbol), typical receivers will not be able to adjust quickly enough to such radically varying channel conditions in order to properly demodulate the received signal. In short, without advance knowledge of the frequency or distortion patterns unintended receivers will not be able to keep up with the rapidly changing signal conditions.

Figure 5A:
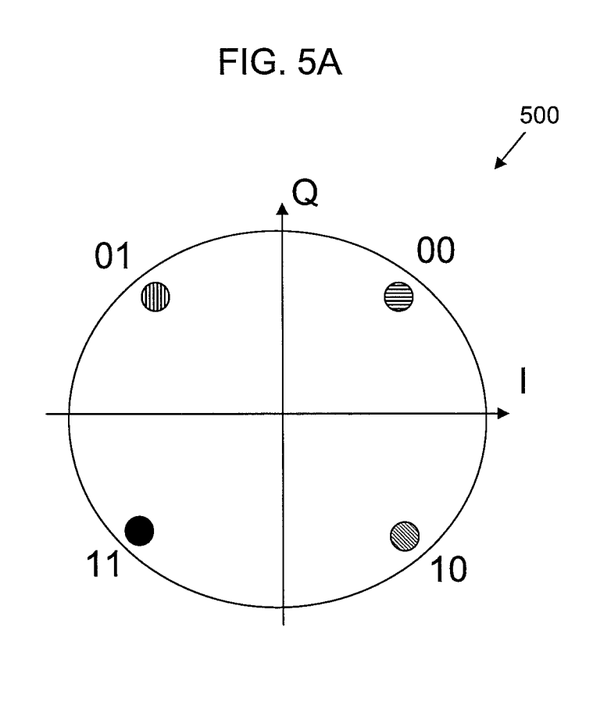
FIG. 5A depicts a typical QPSK constellation diagram of the prior art.
Figure 5B:
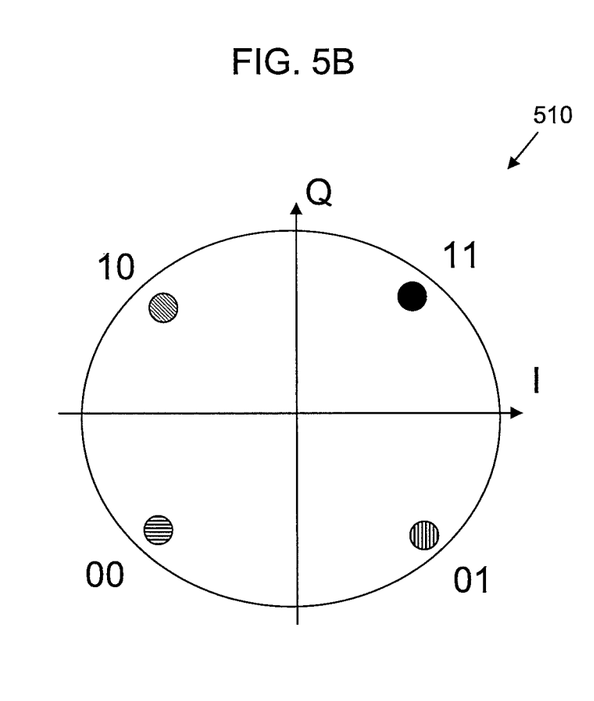
FIG. 5B depicts a QPSK constellation diagram corresponding to various embodiments of the invention.

Referring now to FIGS. 5A-5B, depicted QPSK constellation diagrams 500 and 510 representative of another embodiment of the invention. In particular, FIG. 5A depicts a QPSK diagram 500 reflecting the expected position for each of the possible constellation points (i.e., 00, 10, 11 and 01). However, FIG. 5B depicts a QPSK diagram 510 in which the signal has been pre-distorted by rotating the possible constellation points by 180 degrees. In this fashion, any unsuspecting receivers would incorrectly interpret the received symbols, and hence be unable to read the data stream.

Figure 6:
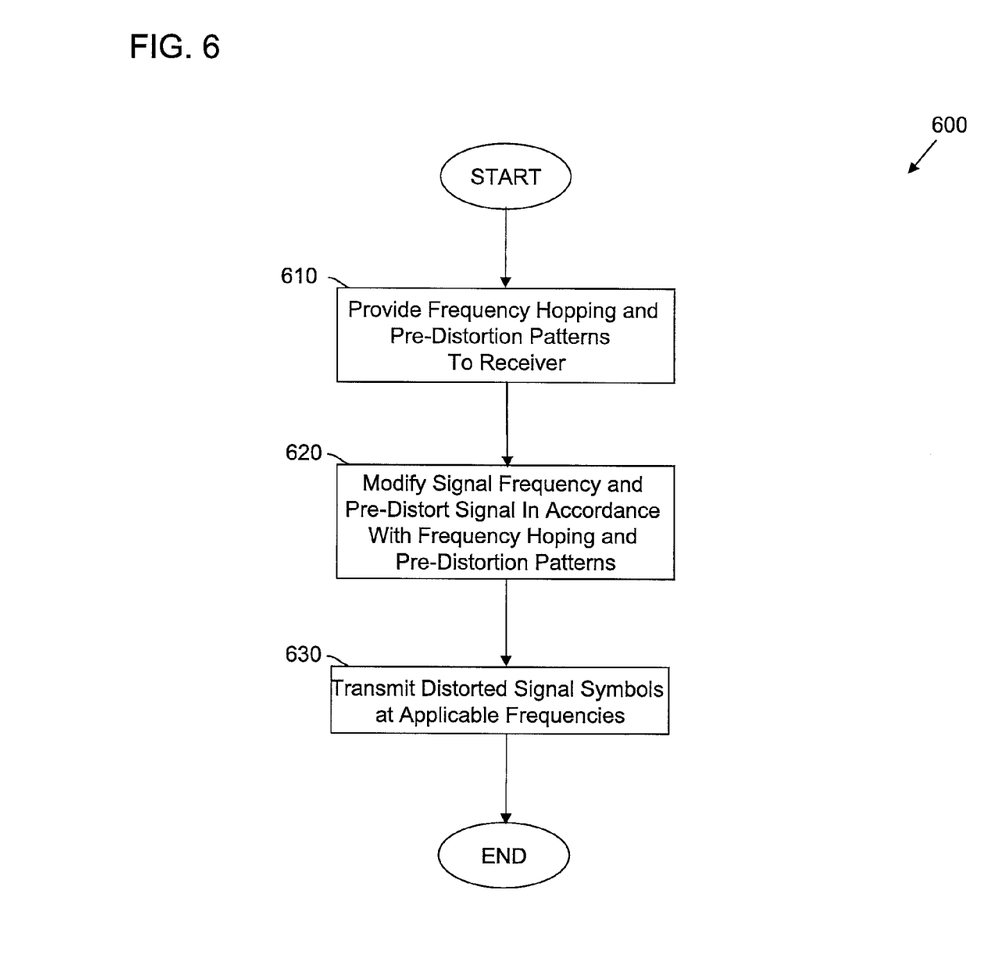
FIG. 6 is another process for implementing one or more aspects of the invention.

Referring now to FIG. 6, depicted is one embodiment of a process to be carried out by the transmission side of a communication system (e.g., system 100 or 150) configured in accordance with the principles of the invention. In particular, process 600 begins at block 610 with a receiver (e.g., receiver 105 or 155) being provided with a frequency hopping and pre-distortion pattern or algorithm. It should be appreciated that the pattern may be provided to the receiver in any manner, so long as it precedes the reception of the pre-distorted signal at issue. In certain embodiments, the frequency hopping pattern may include data representative of how the frequency is to be varied prior to transmission such as, but not limited to, varying the frequency of the signal on a symbol-by-symbol basis. Additionally, the pre-distortion pattern may include data representative of how a given modulation scheme is to be varied prior to transmission such as, but not limited to, a distortion of the phase and/or amplitude of the signal modulation. Similarly, the pre-distortion pattern may include data representative of how a modulation scheme may be changed from one scheme to another (e.g., change from BPSK to QPSK, from QPSK to QAM, from QAM to OFDM, etc.).

Process 600 may then continue to block 620 where the frequency at which the digital signal is to be transmitted may be set in accordance with the frequency hopping pattern that was provided to the receiver above in block 610. As previously described, it should be appreciated that such frequency hopping may be applied to the signal every N symbols transmitted, or as frequently as on a symbol-by-symbol basis. Additionally, at block 620 the signal in question may be pre-distorted by a transmitter (e.g., during signal modulation), in accordance with the pre-distortion pattern that was provided to the receiver above in block 610. While in one embodiment, the pre-distortion includes distorting the phase and/or the amplitude of the modulated signal, it should equally be appreciated that the signal may be distorted in numerous other fashions, such as changing the modulation scheme.

While the operation of block 620 is depicted as being a single operation, it should be appreciated that such frequency hopping and pre-distortion may vary periodically during signal transmission, even as frequently as on a symbol-by-symbol basis. When the frequency and/or pre-distortion varies, the variable frequency and/or distortion applied by the transmitter at block 620 may be an iterative operation in which the signal frequency and pre-distortion is rapidly and continuously being modified on a symbol-by-symbol or packet-by-packet basis, for example, and in accordance with the frequency hopping and pre-distortion patterns of block 610.

Once the frequency has been set and the signal distorted in accordance with the previously-described frequency hopping and pre-distortion pattern, process 600 continues to block 630 where the individual symbols that comprise the pre-distorted signal may then be transmitted at the applicable frequencies out over a network connection (e.g., network 115).

Figure 7:
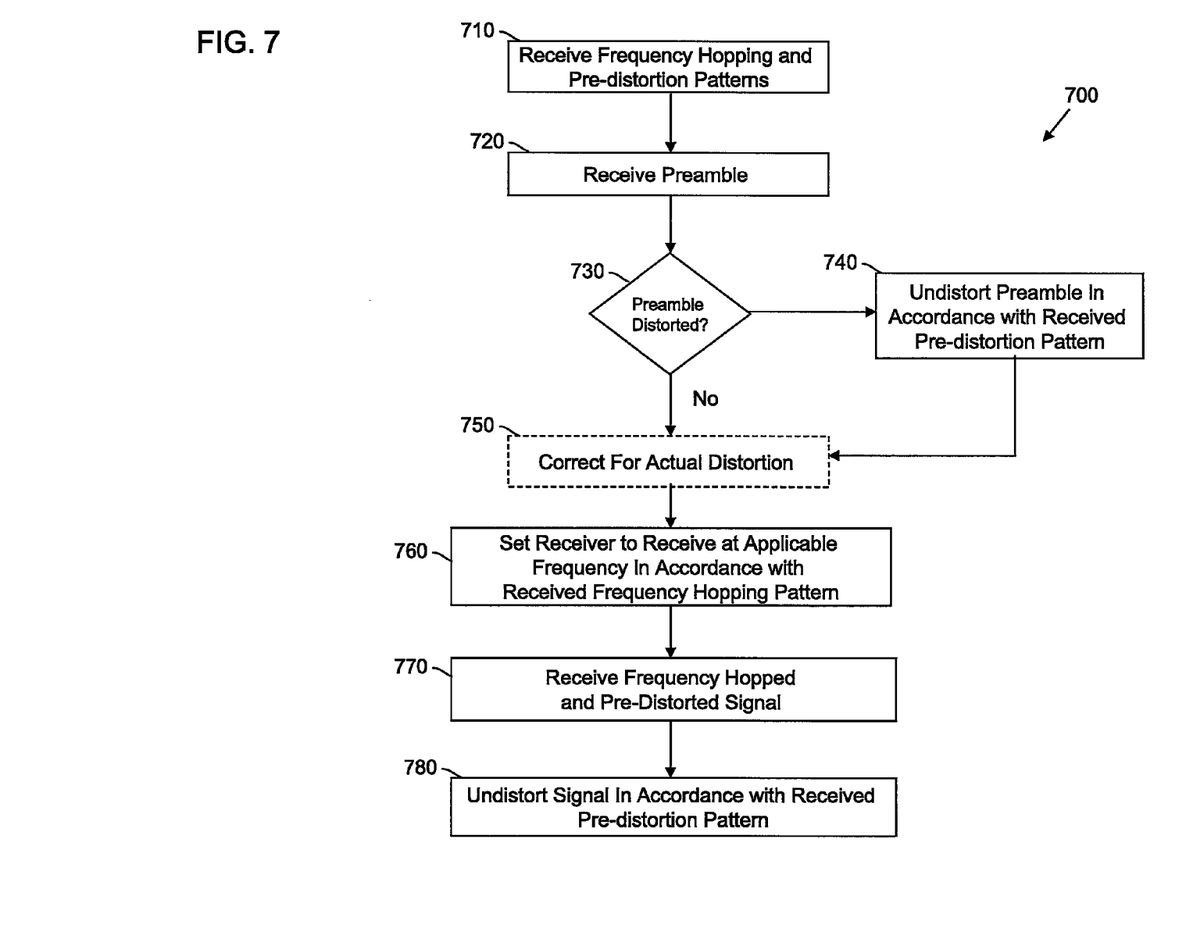
FIG. 7 is still another process for implementing one or more aspects of the invention.

FIG. 7 describes one embodiment of a process to be carried out by the receiver side of a communication system (e.g., system 100 or 150) configured in accordance with the principles of the invention. In particular, process 700 begins at block 710 with the receiving of both the frequency hopping and pre-distortion patterns or algorithms. It should be appreciated that these patterns may be provided to the receiver in any manner, so long as it precedes the reception of a signal that has been frequency hopped and pre-distorted in accordance with the principles of the invention. As described above, it should again be appreciated that the frequency hopping pattern may include data representative of how the frequency is to be varied, such as on a symbol-by-symbol basis, while the pre-distortion pattern may include data representative of how a given modulation scheme is to be varied prior to transmission, such as, but not limited to, a distortion of the phase and/or amplitude of the signal modulation. The pre-distortion pattern may alternatively include data representative of how a modulation scheme may be changed from one scheme to another.

Process 700 may then continue to block 720 where the signal preamble or header frame(s) are received over the network. In certain embodiments, the digital data stream at issue will be preceded by a preamble comprised of a string of predetermined bits. Preferably, this preamble may be communicated on an assigned channel rather than being frequency hopped.

Once a preamble has been received, a determination may then be made at block 730 as to whether the modulation scheme of the preamble has been intentionally pre-distorted or not. While in one embodiment, this determination may be made by comparing the preamble to a reference, or by parsing the preamble for a pre-distortion flag or other indicator, it should be appreciated that numerous other approaches may be similarly employed.

If it is determined at block 730 that the preamble modulation has been distorted, process 700 may continue to block 740 where the preamble's modulation may be undistorted in accordance with the information contained in the pre-distortion pattern received above at block 710. In one embodiment, the undistorting operating of block 740 may be the same as the operation to be described below with reference to block 780.

In any event, once an undistorted preamble is available, whether by virtue of the preamble not having been distorted or by virtue of the undistortion operation of block 740, process 700 may continue to block 750 where any channel-condition-based distortion may be corrected or otherwise compensated for. In one embodiment, the string of predetermined bits within the preamble may be compared to a known reference pattern in order to determine the amount and direction of phase and/or amplitude distortion correction to apply to the incoming signal. Furthermore, it may or may not be necessary to perform some frequency correction where, for example, there are unintended frequency variations due to equipment and/or manufacturing tolerances.

Once any actual channel-condition-based distortion has been corrected, process 700 may continue to block 760 where the receiver may be set to receive at the applicable frequencies in accordance with the frequency hopping pattern from block 710. It should be understood that the operation of block 760 is preferably an iterative operation in which the signal frequency is rapidly and continuously being modified from symbol-to-symbol or packet-to-packet, for example, in accordance with the frequency hopping pattern received at block 710.

At this point in process 700, the receiver may begin to receive the pre-distorted digital data signal symbols at the then-applicable frequencies (block 770). It should be appreciated that the signal may be received over any network, either wired or wireless, from a transmitter which has frequency hopped and pre-distorted the modulation of the digital signal in accordance with predetermined frequency hopping and distortion patterns or algorithms.

Continuing to refer to FIG. 7, process 700 may then continue to block 780 where the received signal may be undistorted in accordance with the pre-distortion pattern of block 710. In one embodiment, this undistortion operation may comprise altering one or both of the phases and amplitude of the signal's modulation in a inverse manner as that applied on the transmitter side. As previously mentioned, the data or information required to properly perform the undistortion operation of block 780 may be provided in the pre-distortion pattern received above at block 710.

While in one embodiment, the undistortion operation of block 780 includes reversing the distortion in the phase and/or the amplitude of the modulated signal, it should equally be appreciated that the signal may be distorted in numerous other fashions, such as changing the modulation scheme.

As with the iterative operation of block 760, it should further be appreciated that the undistortion operation performed at block 780 may similarly be rapidly and continuously performed on, for example, a symbol-by-symbol or packet-by-packet basis.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method for providing secure digital communications comprising:
   transmitting a frequency hopping pattern over a network to an intended receiver;
   transmitting a pre-distortion pattern to the intended receiver;
   setting a first transmission frequency in accordance with said frequency hopping pattern;
   applying a first distortion to at least one of a phase and an amplitude of a first symbol of a data signal in accordance with the pre-distortion pattern to generate a first distorted symbol;
   transmitting the first distorted symbol over the network at the first transmission frequency to the intended receiver;
   setting a second transmission frequency after transmitting the first symbol, wherein the second transmission frequency is based on the frequency hopping pattern;
   transmitting a second symbol of the data signal over the network at the second transmission frequency to the intended receiver.

2. The method of claim 1, wherein said data signal is a video signal, and wherein the method further comprises encoding the data signal prior to said transmitting in accordance with a video coding standard.

3. The method of claim 1, wherein the first symbol and second symbol are sequential symbols comprising a corresponding portion of the data signal.

4. The method of claim 1, further comprising transmitting one or more additional symbols at the first transmission frequency prior to said setting the second transmission frequency.

5. The method of claim 1, wherein the first transmission frequency and second transmission frequency differ by at least 1 Ghz.

6. The method of claim 1, wherein the first transmission frequency and second transmission frequency differ by at least 10 Ghz.

7. A method for providing secure digital communications comprising:
   transmitting a frequency hopping pattern over a network to an intended receiver;
   transmitting a pre-distortion pattern to the intended receiver;
   setting a first transmission frequency in accordance with said frequency hopping pattern;
   applying a first distortion to at least one of a phase and an amplitude of a first symbol of a data signal in accordance with the pre-distortion pattern to generate a first distorted symbol;
   transmitting the first distorted symbol over the network at the first transmission frequency to the intended receiver;
   setting a second transmission frequency after transmitting the first symbol, wherein the second transmission frequency is based on the frequency hopping pattern;
   applying a second distortion to at least one of the phase and the amplitude of at least the second symbol in accordance with said pre-distortion pattern to generate a second distorted symbol; and
   transmitting the second distorted symbol over the network to the intended receiver at the second transmission frequency.

8. A method for providing secure digital communications comprising:

transmitting a frequency hopping pattern over a network to an intended receiver;

transmitting a pre-distortion pattern to the intended receiver;

transmitting a preamble over the network to the intended receiver, wherein the preamble is configured to be compared to a reference pattern for correction of unintended distortion in the data signal;

setting a first transmission frequency in accordance with said frequency hopping pattern;

applying a first distortion to at least one of a phase and an amplitude of a first symbol of a data signal in accordance with the pre-distortion pattern to generate a first distorted symbol;

transmitting the first distorted symbol over the network at the first transmission frequency to the intended receiver;

setting a second transmission frequency, wherein the second transmission frequency is based on the frequency hopping pattern; and transmitting a second symbol of the data signal over the network at the second transmission frequency to the intended receiver.

9. A method for providing secure digital communications comprising:

receiving, by an intended receiver, a frequency hopping pattern over a network from a transmitter;

receiving, by the intended receiver, a pre-distortion pattern from the transmitter;

setting, by the intended receiver, a first receive frequency in accordance with said frequency hopping pattern;

receiving, by the intended receiver, a first symbol of a data signal over the network at the first receive frequency from the transmitter, wherein at least one of a phase and an amplitude of the first symbol have been distorted by the transmitter;

applying a first undistortion to the first symbol in accordance with the predistortion pattern;

setting, by the intended receiver, a second receive frequency after receiving the first symbol, wherein the second receive frequency is based on the frequency hopping pattern;

receiving, by the intended receiver, the second symbol of the data signal over the network at the second receive frequency from the transmitter.

10. The method of claim 9, wherein said data signal is a video signal, and wherein the method further comprises decoding the first and second symbols in accordance with a video coding standard.

11. The method of claim 9, wherein the first symbol and second symbol are sequential symbols comprising a corresponding portion of the data signal.

12. The method of claim 9, further comprising receiving one or more additional symbols at the first receive frequency prior to said setting the second receive frequency.

13. The method of claim 9, wherein the first receive frequency and second receive frequency differ by at least 1 Ghz.

14. The method of claim 9, wherein the first receive frequency and second receive frequency differ by at least 10 Ghz.

15. A method for providing secure digital communications comprising:

receiving, by an intended receiver, a frequency hopping pattern over a network from a transmitter;

receiving, by the intended receiver, a pre-distortion pattern from the transmitter;

setting, by the intended receiver, a first receive frequency in accordance with said frequency hopping pattern;

receiving, by the intended receiver, a first symbol of a data signal over the network at the first receive frequency from the transmitter, wherein at least one of a phase and an amplitude of the first symbol have been distorted by the transmitter;

applying a first undistortion to the first symbol in accordance with the predistortion pattern;

setting, by the intended receiver, a second receive frequency after receiving the first symbol, wherein the second receive frequency is based on the frequency hopping pattern;

receiving, by the intended receiver, the second symbol of the data signal over the network at the second receive frequency from the transmitter wherein at least one of the phase and the amplitude of the second symbol have been distorted by the transmitter; and applying a second undistortion to the second symbol in accordance with the pre-distortion pattern.

16. A method for providing secure digital communications comprising:

receiving, by an intended receiver, a frequency hopping pattern over a network from a transmitter;

receiving, by the intended receiver, a pre-distortion pattern from the transmitter;

receiving a preamble, prior to said first symbol, over the network by the intended receiver;

comparing, by the intended receiver, at least a portion of the preamble to a reference pattern; and setting, by the intended receiver, a first receive frequency in accordance with said frequency hopping pattern;

receiving, by the intended receiver, a first symbol of a data signal over the network at the first receive frequency from the transmitter, wherein at least one of a phase and an amplitude of the first symbol have been distorted by the transmitter;

correcting, by the intended receiver, unintended distortion in at least the first symbol signal based on said comparing;

applying a first undistortion to the first symbol in accordance with the predistortion pattern;

setting, by the intended receiver, a second receive frequency after receiving the first symbol, wherein the second receive frequency is based on the frequency hopping pattern;

receiving, by the intended receiver, the second symbol of the data signal over the network at the second receive frequency from the transmitter.

17. A transmitter comprising:

a network interface configured to couple the transmitter to a network; and a modulation circuit configured to:

transmit a frequency hopping pattern over the network to an intended receiver;

transmit a pre-distortion pattern to the intended receiver;

apply a first distortion to at least one of a phase and an amplitude of the first symbol of the data signal in accordance with the pre-distortion pattern to generate a first distorted symbol;

set a first transmission frequency in accordance with said frequency hopping pattern;

transmit the first distorted symbol over the network at the first transmission frequency to the intended receiver;

set a second transmission frequency after transmitting the first symbol, wherein the second transmission frequency is based on the frequency hopping pattern;

transmit the second symbol of the data signal over the network at the second transmission frequency to the intended receiver.

18. The transmitter of claim 17, wherein said data signal is a video signal, and wherein the transmitter further comprises an encoder configured to encode the data signal in accordance with a video coding standard.

19. The transmitter of claim 17, wherein the first symbol and second symbol are sequential symbols comprising a corresponding portion of the data signal.

20. The transmitter of claim 17, wherein the modulation circuit is further configured to transmit one or more additional symbols at the first transmission frequency prior to said setting the second transmission frequency.

21. The transmitter of claim 17, wherein the first transmission frequency and second transmission frequency differ by at least 1 Ghz.

22. The transmitter of claim 17, wherein the first transmission frequency and second transmission frequency differ by at least 10 Ghz.

23. A transmitter comprising:
a network interface configured to couple the transmitter to a network; and
a modulation circuit configured to:
   transmit a frequency hopping pattern over the network to an intended receiver;
   transmit a pre-distortion pattern to the intended receiver;
   apply a first distortion to at least one of a phase and an amplitude of the first symbol of the data signal in accordance with the pre-distortion pattern to generate a first distorted symbol;
   set a first transmission frequency in accordance with said frequency hopping pattern;
   transmit the first distorted symbol over the network at the first transmission frequency to the intended receiver;
   set a second transmission frequency after transmitting the first symbol, wherein the second transmission frequency is based on the frequency hopping pattern;
   apply a second distortion to at least one of the phase and the amplitude of at least a second symbol in accordance with said pre-distortion pattern to generate a second distorted symbol prior to transmitting the second symbol; and
   transmit the second distorted symbol over the network to the intended receiver at the second transmission frequency.

24. A transmitter comprising:
a network interface configured to couple the transmitter to a network; and
a modulation circuit configured to:
   transmit a frequency hopping pattern over the network to an intended receiver;
   transmit a pre-distortion pattern to the intended receiver;
   transmit a preamble over the network to the intended receiver, wherein the preamble is configured to be compared to a reference pattern for correction of unintended distortion in the data signal;
   apply a first distortion to at least one of a phase and an amplitude of the first symbol of the data signal in accordance with the pre-distortion pattern to generate a first distorted symbol;
   set a first transmission frequency in accordance with said frequency hopping pattern;
   transmit the first distorted symbol over the network at the first transmission frequency to the intended receiver;
   set a second transmission frequency after transmitting the first symbol, wherein the second transmission frequency is based on the frequency hopping pattern;
   transmit the second symbol of the data signal over the network at the second transmission frequency to the intended receiver.

* * * * *